Figure 1:
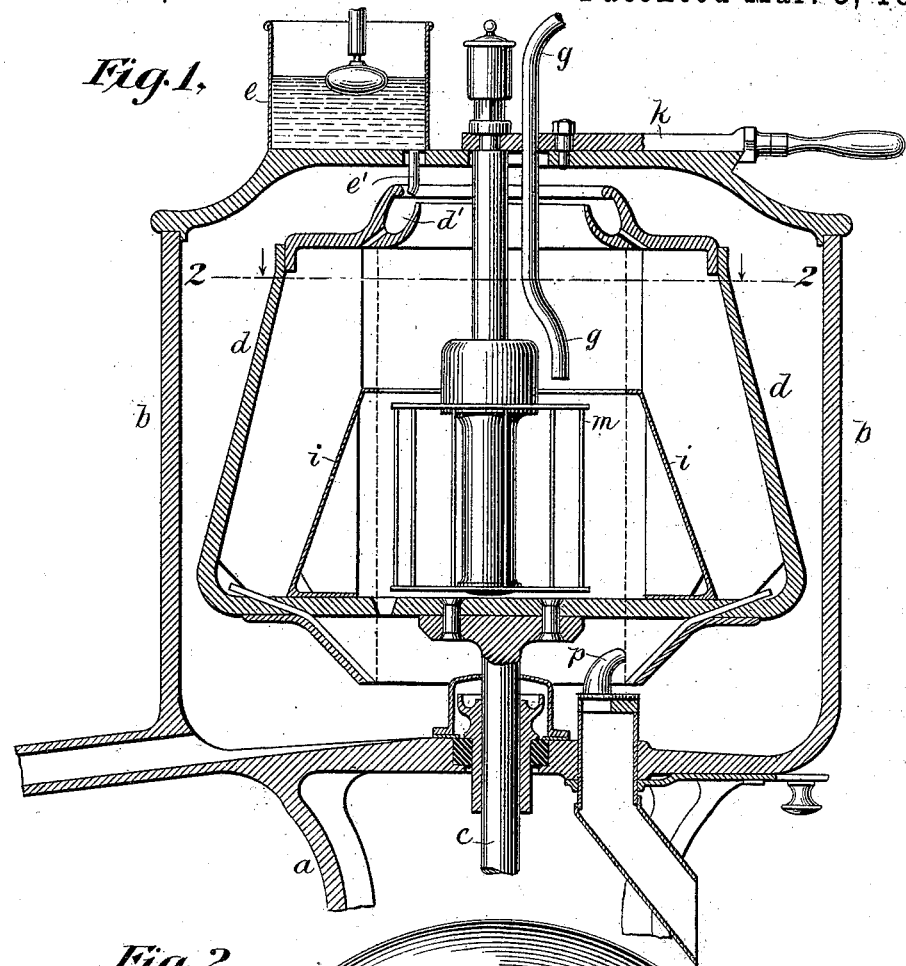

(No Model.)

G. M. ANDERSSON.
MANUFACTURE OF BUTTER.

No. 555,892. Patented Mar. 3, 1896.

Witnesses
C. E. Ashley
H. W. Lloyd

Inventor
Gustaf M. Andersson.
By his Attorneys
Witter & Kenyon

UNITED STATES PATENT OFFICE.

GUSTAF M. ANDERSSON, OF NEWARK, NEW JERSEY.

MANUFACTURE OF BUTTER.

SPECIFICATION forming part of Letters Patent No. 555,892, dated March 3, 1896.

Application filed November 28, 1891. Serial No. 413,378. (No model.)

*To all whom it may concern:*

Be it known that I, GUSTAF M. ANDERSSON, a subject of the King of Sweden and Norway, and a resident of Newark, county of Essex, State of New Jersey, have invented certain new and useful Improvements in the Manufacture of Butter, of which the following is a specification, reference being had to the accompanying drawings, which form a part hereof.

This invention relates to the separation of butter-fat from milk, and has for its object to perform such separation rapidly, efficiently, and economically.

The process of separating or extracting butter-fat from milk involves two steps, which may be carried on separately or conjointly. The first of these steps is that of separating the cream from the milk, and the second that of separating or extracting the butter-fat from the cream. It is well known that the separation of cream from milk is most rapidly and efficiently performed when the milk is at a comparatively high temperature; also, that in the further step of separating or extracting the butter-fat from cream a comparatively low temperature is highly desirable and indeed usually considered necessary.

Before the present invention, in continuous processes of butter-making carried on in one and the same centrifugal machine, such as the well-known Johansson centrifugal process described and claimed in United States Letters Patent No. 399,618, dated March 12, 1889, the two operations of cream separating and of butter extraction have been necessarily carried on at approximately the same temperature; and it has been deemed advisable to do this at a low temperature, thus to some extent sacrificing the efficiency of the cream-separating operation. Nevertheless the temperature at which the continuous process has been carried on has not perhaps been as low as would be desirable if the separation or extraction of butter-fat from separated cream were the entire process, while the temperature has been very much lower than the most efficient temperature for separating the cream from the milk.

My invention makes possible the continuous extraction of butter-fat from milk in one and the same centrifugal machine, while maintaining at each step of the process the temperature best adapted to the working of such process; and my invention consists of a continuous process of first separating the cream from the milk at a suitable temperature and then in the same centrifugal machine throwing upon or mingling with the cream a cooling fluid, thereby cooling the cream down to the desired temperature for butter extraction and separating or extracting the butter from the cooled cream.

My invention also includes a certain new and useful cooling device for centrifugal butter-making apparatus.

In the accompanying drawings I have shown my improved cooling device and thereby illustrated an apparatus adapted for carrying out my improved process of butter separation or extraction; but it is evident that my process may be employed in many other forms of apparatus.

Figure 2:
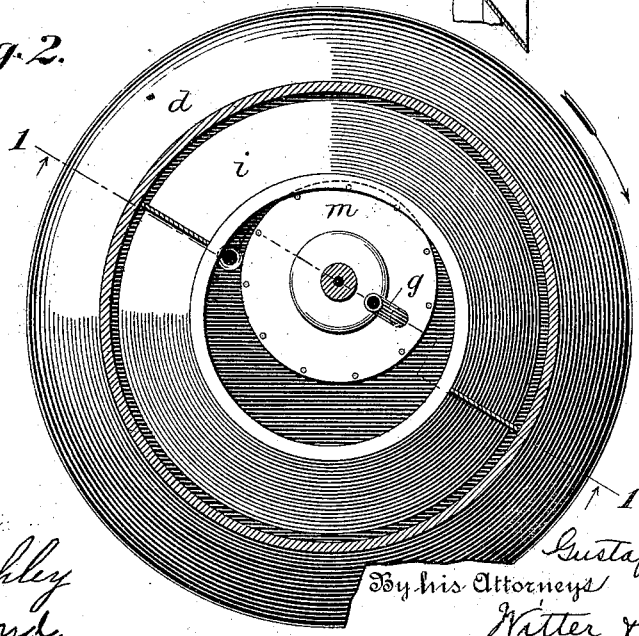

Figure 1 is a vertical section on the line 1 1, Fig. 2, of the apparatus above referred to; and Fig. 2 is a horizontal section of the same on the line 2 2, Fig. 1.

A centrifugal drum $d$ is fixed upon the upper end of an operating-shaft $c$ and fitted to rotate in a stationary frame or casing $b$, supported by a suitable base $a$, the upper portion only of which is shown. In the operation of the machine the drum is revolved at a speed of from six thousand to twelve thousand revolutions per minute.

The milk is fed into the machine in a continuous but preferably a regulated stream from the vessel $e$, mounted upon the top of the casing, through the pipe $e'$ into the annular chamber $d'$. From this annular chamber it flows through suitable openings into the interior of the drum $d$.

Within the drum is a frusto-conical partition $i$, which divides the drum into two chambers. In one of these chambers (the larger and outer one of the drawings) is effected the continuous separation of cream from milk, while in the other chamber (the smaller and inner chamber of the drawings) is effected the continuous separation or extraction of butter from or out of the cream. The separation of the cream from the milk is due to the intense centrifugal action within the drum. The separation or extraction of the butter from the cream is due to the intense centrifugal action within the drum, aided by the disturbing action of an ordinary Johansson trundle-wheel $m$ or other equivalent device. The butter flows from the inner chamber of the drum into a butter-chamber formed at the lower end of the drum, and is removed from such butter-chamber by a butter-knife $p$.

The devices above described are such as are employed in the Johansson process above referred to.

The cooling apparatus forming part of the present invention consists of a conduit or tube extending into the centrifugal drum $d$ and arranged to convey a cooling agent—such as water, brine or milk—into the drum, and to deliver the same so that it will be brought into contact with the cream after the completion of the cream-separating operation and before the commencement of the butter-extracting operation. This tube or conduit $g$ is preferably attached to the adjusting-lever $k$ of the trundle-wheel, and it extends downward to a point just above the upper surface of the trundle-wheel, so that it discharges the cooling fluid upon the trundle-wheel. As the trundle-wheel is revolving at a high rate of speed the fluid is immediately spread out upon the upper disk thereof and thrown outward from the trundle-wheel against the cream-wall. The cooling fluid by actual contact with the cream rapidly reduces its temperature to the desired degree.

Any cooling agent can be used, as well as those above set forth, which is adapted to cool the cream at or before the time of the extraction of the butter.

It is evident that the amount of reduction of temperature varies with the temperature of the cooling agent, and therefore can be adjusted to suit the conditions most desirable.

The initial temperature of the milk may be as high as desired for the cream-separating operation, and the temperature of the cream during the butter-making operation can be reduced to as low a degree as is desired for such operation.

What I claim as new, and desire to secure by Letters Patent, is—

1. The process of making butter from milk which consists in continuously separating cream from milk, then continuously throwing upon or mingling with the cream a cooling fluid thereby cooling the cream, and then continuously extracting or separating butter from the cream.

2. The process of making butter from milk which consists in continuously separating cream from milk by centrifugal force, then continuously throwing upon or mingling with the cream a cooling fluid thereby cooling the cream, and then continuously extracting or separating butter from the cream.

3. The process of making butter from milk which consists in continuously separating cream from milk by centrifugal force, then continuously throwing upon or mingling with the cream a cooling fluid thereby cooling the cream and then continuously extracting or separating butter from the cream by centrifugal force and mechanical disturbance of the particles.

4. The combination with a centrifugal butter-extracting apparatus provided with a separating-drum and with a trundle-wheel, of a fluid-conduit arranged to deliver a cooling fluid upon the surface of the trundle-wheel, substantially as set forth.

5. The combination with a centrifugal butter-extracting apparatus provided with a separating-drum having the partition $i$ therein, and the trundle-wheel $m$, of the fluid-conduit $g$ arranged to deliver a cooling fluid upon the surface of the trundle-wheel, substantially as set forth.

6. The combination with a centrifugal butter-extracting apparatus, of a cream-agitating device adapted to project into the cream-wall and to agitate the same to produce butter and a fluid-supply duct arranged to deliver cooling fluid upon the cream-surface therein at or near the said cream-agitating device, substantially as set forth.

7. The process of making butter from milk which consists in continuously separating cream from milk by centrifugal force, then continuously throwing upon or mingling with the cream a cooling agent thereby cooling the cream, and then continuously extracting or separating butter from the cream by centrifugal force, substantially as set forth.

8. The combination with a centrifugal butter-extracting apparatus of a cream-agitating device adapted to project into the cream-wall and to agitate the same to produce butter, and a supply-duct adapted to deliver a cooling agent upon the cream, substantially as set forth.

GUSTAF M. ANDERSSON.

Witnesses:
HENRY D. WILLIAMS,
SIDNEY MANN.